US005279884A

United States Patent [19]

Kitamura et al.

[11] Patent Number: 5,279,884

[45] Date of Patent: Jan. 18, 1994

[54] THERMAL-TRANSFER RECORDING MEDIUM

[75] Inventors: Shigehiro Kitamura; Hiroshi Watanabe; Takao Abe, all of Hino, Japan

[73] Assignee: Konica Corporation, Tokyo, Japan

[21] Appl. No.: 775,803

[22] Filed: Oct. 11, 1991

[30] Foreign Application Priority Data

Oct. 19, 1990 [JP] Japan .................................. 2-282302

[51] Int. Cl.[5] ................................................ B32B 3/00

[52] U.S. Cl. .................................... 428/195; 428/200; 428/211; 428/343; 428/484; 428/488.1; 428/488.4; 428/913; 428/914

[58] Field of Search ...................... 428/195, 484, 488.1, 428/488.4, 913, 914

[56] References Cited

U.S. PATENT DOCUMENTS 4,954,390 9/1990 Koshizuka et al. ................. 428/212
4,970,119 11/1990 Koshizuka ........................ 428/411.1

*Primary Examiner*—Patrick J. Ryan
*Assistant Examiner*—Elizabeth Evans
*Attorney, Agent, or Firm*—Jordan B. Bierman

[57] ABSTRACT

A thermal-transfer recording medium having thereon a heat-meltable peeling layer, a heat-meltable adhesion layer and provided therebetween an inter layer consisting principally of an ethylene-vinyl acetate copolymer is disclosed. It is suitable for high speed printing of an excellent resolution with low transfer energy.

11 Claims, No Drawings

THERMAL-TRANSFER RECORDING MEDIUM

FIELD OF THE INVENTION

The present invention relates to a thermal-transfer recording medium, and more particularly to a thermal-transfer recording medium capable of transferring a high-quality image with an excellent resolution even onto a transfer image-receiving medium having a poor surface smoothness, and also of realizing a high-quality image printing with low printing energy even in a high-speed printing operation.

BACKGROUND OF THE INVENTION

With the recent popularization of word processors having thermal-transfer devices, a thermal-transfer recording medium comprising a support having thereon a heat-meltable ink layer has now been used extensively.

However, in the conventional thermal-transfer recording medium, its printing quality is liable to be affected by the surface smoothness of a transfer image-receiving medium such as paper, and when used for printing in a high-speed thermal-transfer recording device, it lacks transfer sensitivity to invite deterioration of the print quality, particularly of resolution.

In order to improve the transfer sensitivity, various attempts have been made to have the heat-meltable layer of the thermal-transfer recording medium made in the form of a multilayer composition or provided with a specific peeling layer.

Conventionally known as the peeling layer is one composed principally of a wax such as paraffin.

However, such a peeling layer has a poor peeling characteristic. In order to improve the peeling characteristic, a low-melting paraffin must be used, but in that case, its low-molecular paraffin moiety moves to the ink layer (coloring agent layer), resulting in the deterioration of its printing quality.

To avoid this, the use of a high-melting paraffin or of polyethylene wax as a principal component of the peeling layer is disclosed in JP O.P.I. Nos. 68786/1987 and 87391/1987. The disclosed technique, however, has the problem that in a high-speed printing, the peeling characteristic becomes insufficient and no sufficient transfer sensitivity is obtained.

The present invention has been made on the basis of the above-mentioned situation.

SUMMARY OF THE INVENTION

It is an object of the invention to provide a thermal-transfer recording medium which, in a high-speed printing operation, is capable of transferring a high-quality image having an excellent resolution with sufficiently low transfer energy even onto a poor surface smoothness-having transfer medium.

The above object of the invention is accomplished by a thermal-transfer recording medium comprising a support having thereon at least a heat-meltable peeling layer, a heat-meltable adhesion layer and provided therebetween an intermediate layer comprised principally of an ethylene-vinyl acetate copolymer whose vinyl acetate moiety content is not less than 35% by weight.

DETAILED DESCRIPTION OF THE INVENTION

The thermal-transfer recording medium of the invention comprises a support having thereon at least a heat-meltable peeling layer, an intermediate layer and a heat-meltable adhesion layer in the described order. The thermal-transfer recording medium may have other layers as long as they do not impair the characteristics of the medium; for example, a different intermediate layer may be provided between the heat-meltable adhesion layer and the intermediate layer or between the intermediate layer and the heat-meltable peeling layer; a protective layer as the outermost layer may be provided on the heat-meltable adhesion layer; and an anchor layer may also be provided between the heat-meltable peeling layer and the support. Further, the heat-meltable peeling layer, the intermediate layer and the heat-meltable adhesion layer each may, if necessary, be of a multilayer construction.

The constitution of the thermal-transfer recording medium of the invention will be described in the order of the support, heat-meltable peeling layer, intermediate layer and heat-meltable adhesion layer.

SUPPORT

The support preferably has a good heat resistance and an excellent dimensional stability.

Materials usable as the support include papers such as ordinary paper, condenser paper, laminated paper and coated paper; films of resins such as polyethylene, polyethylene terephthalate, polystyrene, polypropylene and polyimide; paper/resin film complex; and sheets of metal such as aluminum foil.

Thickness of the support is normally not more than 30 μm, and preferably 2 to 30 μm. If the thickness exceeds 30 μm, the thermal conductivity of the support is deteriorated to sometimes lower the print quality.

In the thermal-transfer recording medium of the invention, the back of the support may be of an arbitrary composition comprising e.g., a backing layer such as an antisticking layer may be provided.

Normally, on the support is formed a heat-meltable peeling layer which is described below:

HEAT-MELTABLE PEELING LAYER

This layer serves mainly for enabling the quick peeling/transfer of the layer provided thereon (at least one sublayer thereof contains a coloring agent) when heated by a heating means such as a thermal head for the image transfer. The heat-meltable peeling layer contains a heat-meltable compound suitable for accomplishing the above purpose, and therefore has an excellent peeling characteristic.

The heat-meltable peeling layer may be composed of a heat-meltable compound alone, but is preferably composed of the heat-meltable compound and a binder such as a thermoplastic resin.

The heat-meltable compound content of the heat-meltable peeling layer can not be simply determined because it differs according to the type of the heat-meltable compound or thermoplastic resin used, but should account for normally not less than 50% by weight and preferably 60 to 90% by weight of the whole composition (excluding a coloring agent if contained) of the heat-meltable peeling layer.

If the heat-meltable compound content is too small, the heat-meltable peeling layer is sometimes unable to show its peeling characteristic adequately.

The above heat-meltable compound used as a principal constituent of the heat-meltable peeling layer may be selected from among known compounds including plant waxes such as carnauba wax, Japan wax, candelilla wax, rice wax and ouricury wax; animal waxes such as beeswax, insect wax, shellac wax and spermaceti; petroleum waxes such as paraffin wax, microcrystaline wax, polyethylene wax, Fischer-Tropsch wax, ester wax and oxidated wax; and mineral waxes such as montan wax, ozokerite and ceresin wax. The preferred among these waxes are the microcrystaline wax, paraffin wax and carnauba wax.

Among the above exemplified compounds the preferred heat-meltable compounds as the principal constituent of the heat-meltable peeling layer of the thermal-transfer recording medium of the invention are those having a melting point or softening point of from 50° to 100° C. If the melting point or softening point is too high, the peeling layer is often unable to show its peeling characteristic sufficiently, particularly in a high-speed printing operation, while if it is too low, it causes spontaneous-peeling trouble under normal conditions.

Examples of the preferred heat-meltable compound include microcrystaline wax, paraffin wax and carnauba wax, whose melting point or softening point is in the range of 50 to 100° C.

These heat-meltable compounds may be used alone or in combination.

As the thermoplastic resin which may be used as the binder of the heat-meltable peeling layer, there may be used without restriction any one of those known for the peeling layer of conventional thermal-transfer recording media of this type.

Examples of the thermoplastic resin include ethylene copolymers such as ethylene-vinyl acetate resin: resins such as polyamide resins, polyester resins, polyurethane resins, polyolefin resins, acryl resins and cellulose resins, vinyl chloride resin, rosin resins, petroleum resins and ionomer resins elastomers such as natural rubber, styrene-butadiene rubber, isoprene rubber and chloroprene rubber; and ester rubbers; rosin derivatives such as rosin-maleic acid resin, rosin-phenol resin and hydrogenated rosin. And other resins such as phenol resins, terpene resins, cyclopentadiene resins and aromatic resins may be used if necessary.

Preferably usable among these thermoplastic resins are ethylene copolymers such as ethylene-vinyl acetate copolymer, and cellulose resins.

As the above ethylene-vinyl acetate copolymer there may be suitably used those of which the vinyl acetate moiety content is 10 to 35% by weight, preferably 15 to 28% by weight.

Examples of the foregoing cellulose resin include ethyl cellulose, nitrocellulose, diacetyl cellulose and ethylhydroxy cellulose. Of these, the ethyl cellulose is particularly useful.

Preferably usable among these cellulose resins are those whose ethanol/toluene (ratio by volume of 20/80) solution containing 5% by weight solid matter has a viscosity at 25° C. of not more than 100 cps, particularly not more than 50 cps.

These cellulose resins may be used alone or in combination.

Among the above exemplified thermoplastic resins, the suitable for the invention are those having a melting point or softening point of from 50 to 150° C., preferably 60 to 120° C., and when two or more kinds thereof are used in a mixture, the mixture's melting or softening point should be in the same range.

Where the above thermoplastic binder resin is used as the constituent of the heat-meltable peeling layer, the thermoplastic binder resin accounts for normally not more than 50% by weight, preferably not more than 40% by weight and more preferably 5 to 30% by weight of the whole composition (excluding a coloring agent if contained) of the heat-meltable peeling layer.

If the thermoplastic resin content is too high, the resin is unable to show and retain its intrinsic characteristics sufficiently, while if the content is too low, the resin's effect as a binder becomes so insufficient as to weaken the mechanical strength such as the adhesion of the intermediate layer to the support.

The heat-meltable peeling layer may, if necessary, contain a coloring agent.

Examples of the heat-meltable substance include plant waxes such as carnauba wax, Japan wax, ouricury wax and esparto wax; animal waxes such as beeswax, insect wax, shellac wax and spermaceti; petroleum waxes such as paraffin wax, general microcrystaline waxes, polyethylene wax, ester wax and acid wax; and mineral waxes such as montan wax, ozokerite and ceresin. Besides, there may also be used higher fatty acids such as palmitic acid, stearic acid, margaric acid and behenic acid; higher alcohols such as palmityl alcohol, stearyl alcohol, behenyl alcohol, margaryl alcohol, myricyl alcohol and eicosanol; higher fatty acid esters such as cetyl palmitate, myricyl palmitate, cetyl stearate and myricyl stearate; amides such as actamide, propionic acid amide, palmitic acid amide. stearic acid amide and amide wax; and higher amides such as stearyl amine, behenyl amine and palmityl amine. These may be used alone or in combination.

The preferred among the above waxes is paraffin wax whose melting point measured in the above method is 50 to 100° C.

By using an optimal amount of the above additional heat-meltable material in combination with Microcrystaline wax (I) as the principal component of the peeling layer, the melting point and viscosity of Microcrystaline wax (I) can be lowered or adjusted to an appropriate range, whereby the intrinsic melting point range of Microcrystaline wax (I) can be varied wider to be suitably used.

The coloring agent content of the peeling layer is normally not more than 30% by weight, preferably not more than 20% by weight of the whole composition of the heat-meltable peeling layer.

Usable as the above coloring agent are those commonly used, which include inorganic pigments, organic pigments and organic dyes. Examples of these pigments and dyes will be described hereinafter.

The kind and composition of the coloring agent contained in the peeling layer may be either the same as or different from that contained in the intermediate layer and/or heat-meltable adhsion layer, which will be mentioned hereinafter.

The foregoing peeling layer may, if necessary, additionally contain other constituents within limits not to impair the object of the invention.

Examples of the additional constituents include higher fatty acids such as palmitic acid, stearic acid, margaric acid and behenic acid; higher alcohols such as palmityl alcohol, stearyl alcohol, behenyl alcohol, margaryl alcohol, myricyl alcohol and eicosanol; higher fatty acid esters such as cetyl palmitate, myricyl palmitate, cetyl stearate and myricyl stearate, amides such as acetamide, amide propionate, amide palmitate, amide stearate and amide wax; and higher amines such as stearyl amine, behenyl amine and palmityl amine. These may be used alone or in combination.

The heat-meltable peeling layer may be formed according to an aqueous coating process, a process for coating with an organic solvent or a hot-melt process.

The thickness of the heat-meltable peeling layer is normally 0.2 to 4μm, preferably 0.5 to 2.5 μm.

The heat-meltable peeling layer is required to be in the form of at least one layer. In the invention, the heat-meltable peeling layer may be in the form of two or more sublayers different in the content ratio of the heat-meltable compound and the thermoplastic resin.

The heat-meltable peeling layer may, besides the above constituents, also contain a surface active agent for adjusting the peeling degree. Examples of the surface active agent include polyoxyethylene chain-containing compounds, inorganic and organic fine particles such as metallic powder and silica gel, and oils such as linseed oil.

The heat-meltable peeling layer plays chiefly the role of adjusting the adhesion power of the layer (comprising at least an intermediate layer and a heat-meltable adhesion layer, either one of which layers contains a coloring agent) provided thereon to the support; that is, a layer for facilitating the peeling of the layers from the support, e.g., by heating the back (non-heat-meltable peeling layer side) of the support by means of a heat-transfer mechanism such as a thermal head.

Namely, the heat-meltable peeling layer serves to retain the mechanical characteristics such as the adhesion characteristic and strength of the whole layers to the support, and enables quick peeling/transfer of the layers from the thermal-transfer recording medium onto paper when the layer containing a coloring agent, upon heating, secedes together with the other layer from the support. This peeling depends upon the post-heating timing, peeling angle, applied energy, and printing conditions such as platen pressure, and includes an interfacial peeling that occurs at the interface between the support and the heat-meltable peeling layer adjacent thereto, an aggregation breaking peeling that occurs inside the heat-meltable peeling layer, and an interfacial peeling that occurs at the interface between the heat-meltable peeling layer and the layer adjacent thereto. The preferred in the invention is normally the interfacial peeling between the heat-meltable peeling layer and the intermediate layer adjacent thereto, but is not limited thereto.

In the invention, on the heat-meltable peeling layer is usually formed an intermediate layer that is detailed below.

INTERMEDIATE LAYER

In the thermal-transfer recording medium of the invention, an intermediate layer comprised principally of a specific resin is provided between the heat-meltable peeling layer and the heat-meltable adhesion layer.

It is important for this intermediate layer to consist principally of an ethylene-vinyl acetate copolymer (hereinafter may be called Ethylene-vinyl acetate copolymer (I)) whose vinyl acetate moiety content is not less than by weight, and preferably 40 to 85% by weight.

If an ethylene-vinyl acetate copolymer whose vinyl acetate moiety content is less than 35% by weight is used as the principal constituent of the intermediate layer, it is liable to cause problems of difficulty in the transition of the heat-meltable compound as the effective constituent of the heat-meltable peeling layer to result in failure to sufficiently prevent ink blur trouble and of difficulty in the sufficient maintenance of its mechanical strength, thereby causing deterioration of the resulting print quality or making it impossible to sufficiently improve its preservability at a high temperature, and as a result, the object of the invention cannot be accomplished.

That is, by providing the intermediate layer comprised principally of Ethylene-vinyl acetate copolymer (I) whose vinyl acetate content and ethylene content are in the above specific ranges, a freedom can be created to allow the use of a low-melting or low-softening heat-meltable compound for retaining a sufficient peeling characteristic even in the high-speed printing without hindrance to the heat-meltable peeling layer, thus enabling the realization of a thermal-transfer recording medium excellent in the durability and capable of transferring a quality print image having a high resolution and excellent preservability even in the high-speed printing operation.

The above Ethylene-vinyl acetate copolymer (I) has a melt index MI of normally 2 to 1500, and preferably 20 to 1000. If the MI value is too large, it may bring about problems that the print quality deterioration such as ink blur cannot be prevented and the mechanical strength of the intermediate layer or of the overall layer construction is weakened, while if the value is too small, it can cause a problem of making the intermediate layer too strong to improve the definition of printed letter patterns.

Ethylene-vinyl acetate copolymer (I) may contain as an additional constituent thereof a monomer moiety other than the ethylene and vinyl acetate moieties within limits not to impair the object of the invention. As the additional moiety there may be used various monomers without restriction, which include non-ethylene monomers such as propylene and butylene; and various vinyl monomers such as acryl, methacryl, acrylate, methacrylate, maleic acid, maleic anhydride and vinyl chloride monomers.

Ethylene-vinyl acetate copolymer (I) may be used in the form of a composition containing other constituent such as a plasticizer within limits not to impair the object of the invention.

Ethylene-vinyl acetate copolymer (I) used as the principal constituent of the intermediate layer may be a single copolymer having the foregoing composition or may, if necessary, be comprised in combination of two or more kinds thereof.

The intermediate layer may be comprised of Ethylene-vinyl acetate copolymer (I) alone, or may comprise the copolymer as its principal constituent, if necessary, with other additional resins within limits not to impair the object of the invention.

As the additional resin there may be used various ones without restriction, which include polyester resins, polyurethane resins, acryl resins, cellulose resins and silicone resins. The preferred among these are polyester resins and cellulose resins.

These resins may be used alone or in combination.

The Ethylene-vinyl acetate copolymer (I) content of the intermediate layer is normally not less than 50% by weight, and preferably not less than 60% by weight of the whole composition (excluding a coloring agent if contained) of the intermediate layer.

If the using proportion of Ethylene-vinyl acetate copolymer (I) is too small, the copolymer's intrinsic characteristics lose to possibly cause problems of difficulty in restraining the transition of the heat-meltable compound as the effective constituent of the heat-meltable peeling layer to result in failure to sufficiently prevent the print quality deterioration such as ink blur and of difficulty in the sufficient maintenance of the layer's mechanical strength, whereby the object of the invention cannot be sufficiently accomplished.

The intermediate layer may contain a slight amount of a heat-meltable compound for the purpose of improving, e.g., the definition of printed letter patterns and the durability of the resulting image.

As the heat-meltable compound to be used in a slight amount in the intermediate layer there may be used those previously exemplified heat-meltable compounds, among which particularly the ones having a melting or softening point of normally 50° to 150° C., and preferably 60° to 120° C. may be suitably used.

If a compound (having a very low melting or softening point) is added as the above heat-meltable compound in a larger amount than is necessary to the intermediate layer, the heat-meltable compound moves into the heat-meltable adhesion layer to thereby cause a print quality deterioration such as ink blur, thus leading to difficulty in sufficiently satisfying the intermediate layer's intrinsic function. From this point of view, the heat-meltable compound content of the intermediate layer should be normally not more than 20% by weight, and preferably not more than 10% by weight.

Further, the intermediate layer may contain additives such as various coloring agents such as inks, coloring dyes or pigments, filler, viscosity control agent, plasticizer, various stabilizers and adhesion-improving agent.

Where a coloring agent-free heat-meltable adhesion layer is used as described hereinafter, the intermediate layer should contain a coloring agent. If the heat-meltable adhesion layer should contain a coloring agent, the intermediate layer need not necessarily contain or may or may not contain a coloring agent.

Accordingly, whether the intermediate layer should contain a coloring agent or not and what amount of a coloring agent should be added are determined as the case may be. The adding amount range of a coloring agent to the intermediate layer will be mentioned hereinafter when describing the heat-meltable adhesion layer of the invention.

As the coloring agent there may be used conventional ones including inorganic pigments, organic pigments and organic dyes; examples thereof will be detailed hereinafter in the description of the heat-meltable adhesion layer.

Where a coloring agent is incorporated into the intermediate layer, the kind and composition of the coloring agent may be either the same as or different from those of the coloring agent to be contained in the aforementioned heat-meltable peeling layer and heat-meltable adhesion layer.

Besides the above-mentioned constituents, the intermediate layer may, if necessary, contain additional constituents including resins such as vinyl chloride resin, rosin resin, petroleum resin and ionomer resin; elastomers such as natural rubber, styrene-butadiene rubber, isoprene rubber and chloroprene rubber; ester rubbers; rosin derivatives such as rosin-maleic acid resin, rosin-phenol resin and hydrogenated rosin; and phenol resin, terpene resin, cyclopentadiene resin and aromatic resins.

The intermediate layer may, if necessary, contain within limits not to impair the object of the invention still further constituents including higher fatty acids such as palmitic acid, stearic acid, margaric acid and behenic acid; higher alcohols such as palmityl alcohol, stearyl alcohol, behenyl alcohol, marganyl alcohol, myricyl alcohol and eicosanol; higher fatty acid esters such as cetyl palmitate, myricyl palmitate, cetyl stearate and myricyl stearate: amides such as acetamide, propionic acid amide, palmitic acid amide, stearic acid amide and amide wax; and low-molecular compounds such as stearylamine, behenylamine and palmitylamine.

Further, inorganic or organic fine particles such as metallic powder or silica gel, and oils such as linseed oil may also be added.

The intermediate layer may be formed by using an aqueous coating process or a process for coating with use of an organic solvent.

Namely, the foregoing Ethyl-vinyl acetate copolymer (I) and, if necessary, additional heat-meltable compounds, resins and coloring agents are dissolved or dispersed in water or an appropriate organic solvent, and the prepared solution or dispersion is then coated on the foregoing heat-meltable peeling layer.

The thickness of the above intermediate layer is normally 0.5 to 4.5 μm, and preferably 0.6 to 3.0 μm.

The intermediate layer is required to be at least one layer. In the invention, the intermediate layer is allowed to be comprised of two or more sublayers; e.g., one sublayer is of the Ethylene-vinyl acetate copolymer composition alone, while the other comprised of two sublayers different in the ratio of Ethylene-vinyl acetate copolymer (I) to other constituents such as the heat-meltable compound, resin and coloring agent.

The intermediate layer plays mainly the role of preventing the crossover transition of or mixing of the respective constituents of the heat-meltable peeling layer and the heat-meltable adhesion layer with the intermediate layer therebetween, and is a layer for realizing a thermal-transfer recording medium enough to satisfy the object of the invention by way of enabling the heat-meltable peeling layer and the heat-meltable adhesion layer to have their own respective independent compositions so as to sufficiently carry out their functions.

The intermediate layer retains the mechanical nature such as the adhesion and strength of the overall layers provided thereon to the heat-meltable peeling layer, and has a function to enable quick transfer, upon heating in the printing operation, of the coloring agent-containing layer provided on the heat-meltable peeling layer from the support onto paper, employing the adequate peeling characteristic of the heat-meltable peeling layer.

The above excellent function of the intermediate layer can be effectively exhibited by having the intermediate layer dominated by the foregoing specific resin, i.e, Ethylene-vinyl acetate copolymer (I).

HEAT-MELTABLE ADHESION LAYER

After the intermediate layer is coated in the above manner, on the layer is formed at least one heat-meltable adhesion layer.

The heat-meltable adhesion layer comprises a heat-meltable compound, a thermoplastic resin and the like heat meltable compound, a thermoplastic resin and a coloring agent.

Usable as the heat-meltable compound for the heat-meltable adhsion layer are those commonly used in the heat-meltable ink layer of conventional thermal-transfer recording media of this type, and examples of the compound include low-molecular thermoplastic resins such as polystyrene resin, acryl resin, styreneacryl resin, polyester resin and polyurethane resin; plant waxes such as carnauba wax, Japan wax, candelilla wax, rice wax, ouricury wax and esparto wax; animal waxes such as beeswax, insect wax, shellac wax and spermaceti; petroleum waxes such as paraffin wax, microcrystaline waxes, polyethylene wax. Fischer-Tropsch wax, ester wax and oxidated wax; mineral waxes such as montan wax, ozokerite and ceresin wax; rosin derivatives such as rosin, hydrogenated rosin, polymerized rosin, rosin-modified glycerol, rosin-modified maleic acid resin, rosin-modified polyester resin, rosin-modified phenol resin and ester gum; and phenol resins, terpene resins, ketone resins, cyclopentadiene resins and aromatic hydrocarbon resins.

These heat-meltable compounds have a molecular weight of normally not more than 10,000, particularly not more than 5,000 and a melting point or softening point of preferably 50° to 150° C.

These heat-meltable compounds may be used alone or in combination.

Usable as the thermoplastic resin for the heat-meltable adhesion layer are those used in the heat-meltable ink layer of conventional thermal-transfer recording media of this type. Examples of the resin include ethylene copolymers, polyamide resins, polyester resins, polyurethane resins, polyolefin resins, acryl resins and cellulose resins. Among these resins, the ethylene copolymer is suitably used.

Examples of the ethylene copolymer include ethylene-vinyl acetate copolymer, ethylene-ethyl acrylate resin, ethylene-vinyl acetate-maleic anhydride resin, ethylene acrylic acid resin, ethylene-methacrylic acid resin and ethylene-α-olefin copolymer. The preferred among these ethylene copolymers are ethylene-vinyl acetate copolymers such as ethylene-vinyl acetate copolymer, ethylene-ethyl acrylate resin and ethylene-ethyl acrylate-maleic anhydride resin, or ethylene-vinyl acetate copolymer and ethylene-ethyl acrylate resin or ethylene-ethyl acrylate resin. The most preferred is ethylene-vinyl acetate copolymer.

The non-ethylene comonomer content of these ethylene copolymers is preferably not less than 28% by weight, and preferably not less than 35% by weight.

By using the above specific composition comprising the ethylene-vinyl acetate copolymer and/or ethylene-ethyl acrylate resin as the thermoplastic resin or principal component of the heat-meltable adhesion layer, still better improvement of the adhesion property of the ink layer even to a poor surface smoothness-having copying paper can be accomplished to thereby realize a high fixability of the printed image quality.

The above thermoplastic resin used as a component of the heat-meltable adhesion layer has a melt index (MI value) of normally 2 to 1,500, and preferably 20 to 500. It is apparent that the use of a thermoplastic resin having a MI value in the above range enables to sufficiently increase the adhesion power of the heat-meltable adhesion layer.

The aforementioned thermoplastic resins may be used alone or in combination.

In the invention, when the heat-meltable adhesion layer should be coated by an aqueous coating process, the thermoplastic resin may be used in the form of an aqueous emulsion. An aqueous emulsion of the thermoplastic resin is commercially available.

In the thermal-transfer recording medium of the invention, a coloring agent is incorporated into the intermediate layer provided between the heat-meltable peeling layer and the heat-meltable adhesion layer and/or into at least one sublayer of the heat-meltable adhesion layer. That is, a coloring agent may be incorporated into the intermediate layer alone, into the heat-meltable adhesion layer alone, or into both the layers.

As the foregoing coloring agent used as a component of the heat-meltable adhsion layer there maybe used without restriction those applicable to the heat-meltable ink layer of conventional thermal-transfer recording media of this type, which include inorganic pigments, organic pigments and organic dyes.

Examples of the above inorganic pigment include titanium oxide, carbon black, zinc oxide, prussian blue, cadmium sulfide. iron oxide and chromates of zinc, of barium and of calcium.

Examples of the above organic pigment include azo pigments, thioindigo pigments, anthraquinone pigments, anthoanthraquinone pigments, triphendioxazine pigments, vat dye pigments, phthalocyanine pigments such as copper phthalocyanine and derivatives thereof, and quinacridone pigments.

Examples of the above organic dye include acid dyes, direct dyes, disperse dyes, oil-soluble dyes and metal-containing oil-soluble dyes.

These coloring agents may be used alone or in combination.

The coloring agent to be contained in the heat-meltable adhesion layer may be either the same as or different from the one contained in the intermediate layer or the heat-meltable peeling layer.

The foregoing heat-meltable compound in the heat-meltable adhesion layer accounts for normally 20 to 80% by weight and preferably 30 to 70% by weight of the whole composition (excluding a coloring agent if contained) of the heat-meltable adhesion layer. If the heat-meltable compound content is too small, it may sometimes impair the legibility of minute letter patterns printed, while if the content is too large, it may cause a background stain.

The foregoing thermoplastic resin in the heat-meltable adhesion layer accounts for normally 5 to 40% by weight and preferably 10 to 30% by weight of the whole composition (excluding a coloring agent if contained) of the heat-meltable ink layer. If the thermoplastic resin content is too small, it may cause the recording medium to be unable to clearly record letter patterns on a poor surface smoothness-having paper, while if the content is too high, it may cause blocking trouble at a high temperature.

The coloring agent content of the heat-meltable adhesion layer can not be simply determined because it depends upon whether the intermediate layer contains a coloring agent or not, and also upon the coloring agent content of the intermediate layer. If the intermediate layer contains no coloring agent, the heat-meltable adhesion layer is to contain a coloring agent. In this instance, the coloring agent accounts for normally 5 to 30% by weight and preferably 10 to 25% by weight of the whole composition of the heat-meltable adhesion layer. If the coloring agent content is too small, it may cause a density-reduced or broken image, leading to a failure in accomplishing the object of the invention, while if the content is too large, it may result in an insufficient fixation of the heat-meltable adhesion layer to a transfer-receiving medium.

On the other hand, if the heat-meltable adhesion layer contains no coloring agent, the intermediate layer is to contain a coloring agent. In this instance, the coloring agent accounts for normally 5 to 50% by weight, and preferably 10 to 45% by weight of the whole composition of the intermediate layer. If the coloring agent content of the intermediate layer is too small, it may produce density-reduced or broken, unlegible image patterns, while if the content is too large, it may bring about a problem of lowering the adhesion strength or mechanical strength of the intermediate layer.

Where the coloring agent is incorporated into both the intermediate layer and the heat-meltable adhesion layer, the coloring agent content of the intermediate layer should account for normally not more than 30% by weight and preferably from 5 to 20% by weight of the whole composition of the intermediate layer, while the coloring agent content of the heat-meltable adhesion layer should account for normally not more than 30% by weight and preferably 5 to 20% by weight of the whole composition of the heat-meltable adhesion layer.

The lower limit of the total coloring agent content of the whole intermediate and heat-meltable adhesion layers may be discretionally determined according to the purpose for which the thermal-transfer recording medium is used.

In the invention, which of the intermediate layer and the heat-meltable adhesion layer should contain the coloring agent and in what proportion the coloring agent should be contained are also determined according to the purpose for which the thermal-transfer recording medium of the invention is used.

The above heat-meltable adhesion layer may, if necessary, contain additives besides the aforementioned constituents as long as they do not impair the object of the invention.

The thickness of the heat-meltable adhesion layer is normally 0.2 to 5.0 μm and preferably 0.5 to 4.0 μm.

The heat-meltable ink layer may be formed by coating a dispersion or solution of its constituents dispersed or dissolved in an organic solvent (organic solvent method) or by coating an aqueous emulsion of its constituents dispersed in water.

The aqueous emulsion used directly in the aqueous coating of the heat-meltable adhesion layer can be formed by dispersing the above various constituents into water, but may also be prepared by mixing an aqueous emulsion of the foregoing thermoplastic resin and an aqueous emulsion of the foregoing heat-meltable compound and further by adding other constituents thereto.

An aqueous emulsion of the thermoplastic resin may be prepared in accordance with a conventionally known method therefor, and may also be obtained according to an ordinary emulsion copolymerization method. A commercially available thermoplastic aqueous emulsion as it is or arbitrarily adjusted may of course be used.

The layer forming constituents content in total of the coating liquid for use in coating the heat-meltable adhesion layer is in the range of normally 5 to 50% by weight.

Examples of the method for coating the above constituents include wire-bar coating method, squeeze-coating method and gravure-coating method.

The heat-meltable adhesion layer needs to be at least one layer, but may be comprised of two or more sublayers different in the kind and content of the coloring agent or the thermoplastic plastic resin/heat-meltable compound ratio by weight.

OTHERS

In the thermal-transfer recording medium of the invention, if necessary, an anchor layer may be provided between the support and the heat-meltable peeling layer or an intermediate layer different from the foregoing intermediate layer may be provided between the heat-meltable peeling layer and the intermediate layer and/or between the intermediate layer and the heat-meltable adhesion layer.

Further, a protective overcoat layer may be provided on the heat-meltable adhesion layer.

As the above overcoat layer there may be suitably used, e.g., a coloring agent-free wax or polymer layer.

After coating the respective layers, the coated recording medium is dried and subjected to a surface smoothening treatment, and then slit or cut into a desired form, whereby a thermal-transfer recording medium of the invention is produced.

The thus obtained thermal-transfer recording medium may be used in the tape form or typewriter ribbon form.

The thermal transfer method which uses the thermal-transfer recording medium of the invention does not differ from conventional thermal-transfer recording methods, but it will be described, taking the case where a thermal head is used as a typical heat source.

The heat-softening layers such as the heat-meltable peeling layer, the intermediate layer and the heat-meltable adhesion layer of the thermal-transfer recording medium of the invention is brought into contact with a recording paper, and, as needed, onto the back of the paper, while being given a thermal pulse by a platen, is applied a thermal pulse by means of a thermal head, whereby the heat-softening layer is locally heated corresponding to the desired recording pattern.

The heated pattern area of the heat-softening layer is quickly softened by its increasing temperature and then transferred onto a recording paper.

In this instance, the heat-meltable peeling layer, because of containing a heat-meltable compound excellent in the peeling characteristic, is quickly peeled from the support even in a high-speed printing, and the intermediate layer and heat-meltable adhesion layer, because of containing at least the foregoing thermoplastic resin, exhibit a high adhesion power even to a poor surface smoothness-having recording paper, thus forming a well-fixed high-quality recorded pattern image on the paper.

Particularly, the thermal-transfer recording medium of the invention, since it has an intermediate layer comprised principally of a specific resin between its heat-meltable peeling layer and its heat-meltable adhesion layer, has such excellent characteristics that the heat-meltable peeling layer is allowed to contain a heat-meltable compound having a melting point or softening point so suitably low and excellent as to meet the requirement for peeling, and besides, the heat-meltable peeling layer has an ability to easily restrain the diffusion/transition of the heat-meltable compound having such a low melting or softening point to thereby sufficiently prevent the print quality deterioration such as ink blur.

That is, the thermal-transfer recording medium of the invention can be realized as a practically advantageous one having an excellent resolution due mainly to its intermediate layer's action and function, and, even in a high-speed printing operation, capable of transfering a quality print image with sufficiently low energy even onto a poor surface smoothness-having paper, and furthermore, having excellent preservability and durability.

EXAMPLES

In the following description, the composition of each ethylene-vinyl acetate copolymer is shown in the ratio of ethylene monomer % by weight/vinyl acetate monomer % by weight.

EXAMPLE 1

On a 3.5 μm-thick polyethylene terephthalate film was coated an IPA dispersion (solid matter: 20%) of the following composition for heat-meltable peeling layer so as to have a dry thickness of 1.0 μm to thereby form a heat-meltable peeling layer. The above coating was performed by using a wire bar.

| Composition for heat-meltable peeling layer | |
|---|---|
| Microcrystaline wax (melting point: 81° C.), (Nisseki Micro Wax 180, produced by Nippon Oil Co., Ltd.) | 45 wt % |
| Paraffin Wax (melting point: 75° C.) | 50 wt % |
| Ethylene-vinyl acetate copolymer (72/28) | 5 wt % |

Next, on the above heat-meltable peeling layer was coated the following resin for intermediate layer so as to have a dry thickness of 1.0 μm to thereby form an intermediate layer.

The coating was conducted by a coating process using MEK.

| Resin for intermediate layer | |
|---|---|
| Ethylene-vinyl acetate copolymer (60/40) | 100 wt % |

Subsequently, on the above intermediate layer was coated the following composition for heat-meltable adhesion layer so as to have a dry thickness of 1.0 μm to form a heat-meltable adhesion layer, whereby a thermal-transfer recording medium sample of the invention was prepared.

The above coating was performed by a coating process using an organic solvent (IPA).

| Composition for heat-meltable adhesion layer | |
|---|---|
| Carbon black | 20 wt % |
| Ethylene-vinyl acetate copolymer (60/40) | 25 wt % |
| Alkyl phenol resin | 25 wt % |
| Paraffin wax (melting point: 75° C.) | 30 wt % |

The obtained thermal-transfer recording medium sample was loaded in a commercially available high-speed printer having a 48-dot serial head to transfer alphabetical and other charactor patterns onto PPC paper having a Bekk smoothness of 30 seconds to thereby evaluate the resolution, transfer sensitivity and preservability at a temperature of 50° C. of the transferred image on the rough surface of the paper in a high-speed printing under a platen pressure of 350 g/head. The results are shown in Table 1.

The respective characteristics were evaluated according to the following criteria:

| Resolution (reproducibility of checkered pattern) | |
|---|---|
| A | Excellent |
| B | Good |
| C | Poor |
| D | Bad |
| Transfer sensitivity | |
| A | Sufficiently good |
| B | Good |
| C | Slightly insufficient |
| D | Insufficient |
| Preservability (by comparison with fresh sample) | |
| A | The same |
| B | Almost the same |
| C | Slightly deteriorated) |
| D | Deteriorated |

EXAMPLE 2

A thermal-transfer recording medium sample was prepared and evaluated in the same manner as in Example 1 except that the compositions for heat-meltable peeling layer, intermediate layer and heat-meltable adhesion layer used in Example 1 were replaced by the following compositions for heat-meltable peeling layer, intermediate layer and heat-meltable adhesion layer, respectively.

The results are shown in Table 1.

| Composition for heat meltable peeling layer | |
|---|---|
| Microcrystaline wax (melting point: 83° C.) (Hi-Mic-1080, produced by Nippon Seiro Co.) | 90 wt % |
| Ethylene-vinyl acetate copolymer (72/28) | 10 wt % |
| **Composition for intermediate layer** | |
| Ethylene-vinyl acetate copolymer (45/55) | 50 wt % |
| Low-molecular polyester resin (softening point: 90° C.) | 10 wt % |
| Carbon black | 40 wt % |
| **Composition for heat-meltable adhesion layer** | |
| Ethylene-vinyl acetate copolymer (45/55) | 50 wt % |
| Carnauba wax | 40 wt % |
| Polyamide resin (melting point: 10° C.) | 10 wt % |

EXAMPLE 3

A thermal-transfer recording medium sample was prepared and evaluated in the same manner as in Example 1 except that the compositions for heat-meltable peeling layer, intermediate layer and heat-meltable adhesion layer used in Example 1 were replaced by the following compositions for heat-meltable peeling layer, intermediate layer, and heat-meltable adhesion layer, respectively.

The results are shown in Table 1.

| Composition for heat-meltable peeling layer | |
|---|---|
| Microcrystaline wax (melting point: 83° C.) (Hi-Mic-1080, produced by Nippon Seiro Co.) | 90 wt % |
| Ethylene-vinyl acetate copolymer (72/28) | 10 wt % |
| **Composition for intermediate layer** | |
| Ethylene-vinyl acetate copolymer (45/55) | 80 wt % |
| Carbon black | 20 wt % |
| **Composition for heat-meltable adhesion layer** | |
| Ethylene-vinyl acetate copolymer (40/60) | 25 wt % |
| Microcrystaline wax (melting point: 81° C.) | 25 wt % |

-continued

| | |
|---|---|
| Rosin-modified maleic acid (softening point: 105° C.) | 40 wt % |
| Carbon black | 10 wt % |

EXAMPLE 4

A thermal-transfer recording medium sample was prepared and evaluated in the same manner as in Example 1 except that the compositions for heat-meltable peeling layer, intermediate layer and heat-meltable adhesion layer used in Example 1 were replaced by the following compositions for heat-meltable peeling layer, intermediate layer and heat-meltable adhesion layer.

The results are shown in Table 1.

| | |
|---|---|
| **Composition for heat-meltable peeling layer** | |
| Microcrystaline wax (melting point 83° C.) (Hi-Mic-1080, produced by Nippon Seiro Co.) | 70 wt % |
| Paraffin wax (melting point: 75° C.) | 15 wt % |
| Ethylene-vinyl acetate copolymer (72/28) | 5 wt % |
| Carbon black | 10 wt % |
| **Composition for intermediate layer** | |
| Ethylene-vinyl acetate copolymer (45/55) | 55 wt % |
| Ethyl cellulose | 5 wt % |
| Carbon black | 40 wt % |
| **Composition for heat-meltable adhesion layer** | |
| Ethylene-vinyl acetate copolymer (15/85) | 25 wt % |
| Microcrystaline wax (melting point: 83° C.) | 25 wt % |
| Polyamide resin (softening point: 105° C.) | 50 wt % |

COMPARATIVE EXAMPLE 1

A thermal-transfer recording medium sample was prepared and evaluated in the same manner as in Example 1 except that the heat-meltable peeling layer was formed directly on the heat-meltable adhesion layer by excluding the intermediate layer from the sample of Example 1.

The results are shown in Table 1.

COMPARATIVE EXAMPLE 2

A thermal-transfer recording medium sample was prepared and evaluated in the same manner as in Example 1 except that the intermediate layer composition alone of the sample of Example 1 was replaced by the following composition for intermediate layer.

The results are shown in Table 1.

| Composition for intermediate layer | |
|---|---|
| Ethylene-vinyl acetate copolymer (72/28) | 100 wt % |

COMPARATIVE EXAMPLE 3

A thermal-transfer recording medium sample was prepared and evaluated in the same manner as in Example 1 except that the heat-meltable adhesion layer composition was replaced by polyethylene wax having a melting point of 107° C., and the intermediate layer was excluded from the sample of Example 1.

The results are shown in Table 1.

TABLE 1

| | Characteristics of image printed on PPC (Bekk smoothness: 30 sec.) | | |
|---|---|---|---|
| | Resolution | Sensitivity | Preservability |
| Example 1 | A | A | B |
| Example 2 | A | A | A |
| Example 3 | A | A | A |
| Example 4 | A | A | A |
| Comparative example 1 | B | B | D |
| Comparative example 2 | B | B | D |
| Comparative example 3 | B | D | B |

As is apparent from Table 1, the thermal-transfer recording medium of the invention, even when used in a high-speed printing with low energy onto a poor surface smoothness-having PPC paper, shows a high transfer sensitivity and produces a well-transferred image having a high resolution and excellent preservability.

What is claimed is;

1. A thermal-transfer recording medium comprises a support having thereon a heat-meltable peeling layer, a heat-meltable adhesion layer and provided therebetween an inter layer consisting principally of an ethylene-vinyl acetate copolymer whose vinyl acetate moiety content is not less than 35% by weight.

2. A thermal-transfer recording medium of claim 1 wherein the vinyl acetate moiety content is 40 to 85 % by weight.

3. A thermal-transfer recording medium of claim 1 wherein the ethylene-vinyl acetate copolymer has a melt index of 20 to 1,000.

4. A thermal-transfer recording medium of claim 1 wherein the ethylene-vinyl acetate copolymer content of the intermediate layer is not less than 50% by weight.

5. A thermal-transfer recording medium of claim 4 wherein the ethylene-vinyl acetate copolymer content of the intermediate layer is not less than 60% by weight.

6. A thermal-transfer recording medium of claim 1 wherein the intermediate layer contains a heat-meltable compound having a melting point of 50 to 150° C. in an amount of not more than 20% by weight.

7. A thermal-transfer recording medium of claim 1 wherein thickness of the intermediate layer is 0.5 to 4.5 μm.

8. A thermal-transfer recording medium of claim 1 wherein the heat-meltable peeling layer or the heat-meltable adhesion layer contains a coloring agent.

9. A thermal-transfer recording medium of claim 8 wherein the heat-meltable adhesion layer contains a coloring agent.

10. A thermal-transfer recording medium comprises a support having thereon a heat-meltable peeling layer having a thickness of 0.5 to 2.5 μm, a heat-meltable adhesion layer containing a coloring agent and having a thickness of 0.5 to 4.0 μm, and provided therebetween an inter layer consisting principally of an ethylene-vinyl acetate copolymer whose vinyl acetate moiety content is 40 to 85% by weight and having a thickness of 0.6 to 3.0 μm.

11. A thermal transfer recording medium comprising a support having thereon a heat-meltable peeling layer, a heat-meltable adhesion layer and, provided therebetween and adjacent to each of said heat-meltable peeling layer and heat-meltable adhesion layer, an interlayer consisting principally of an ethylene-vinyl acetate copolymer, a vinyl acetate moiety of said copolymer being not less than 35%, by weight.

* * * * *